United States Patent [19]

Raichlen et al.

[11] Patent Number: 4,594,853

[45] Date of Patent: Jun. 17, 1986

[54] WAVE POWERED GENERATOR

[75] Inventors: Fredric Raichlen, San Marino; Jiin-Jen Lee, Sierra Madre, both of Calif.

[73] Assignee: Wave Power Industries, Arcadia, Calif.

[21] Appl. No.: 588,916

[22] Filed: Mar. 12, 1984

[51] Int. Cl.4 .............................................. F03B 13/12
[52] U.S. Cl. ...................................... 60/502; 417/331; 60/398
[58] Field of Search ................. 60/497, 499, 502, 398; 290/53; 417/330, 331, 333

[56] References Cited

U.S. PATENT DOCUMENTS

| | | | |
|---|---|---|---|
| 3,487,228 | 12/1969 | Kriegel | 417/331 X |
| 4,189,918 | 2/1980 | Moody | 290/53 |
| 4,260,901 | 4/1981 | Woodbridge | 417/331 X |
| 4,441,316 | 4/1984 | Moody | 60/497 X |

Primary Examiner—Allen M. Ostrager
Attorney, Agent, or Firm—Sheldon & Mak

[57] ABSTRACT

An apparatus for generating power from the wave motion of the oceans has a resonant chamber operating in the fundamental mode with a float in the chamber. The chamber amplifies the amplitude of the ocean waves.

41 Claims, 8 Drawing Figures

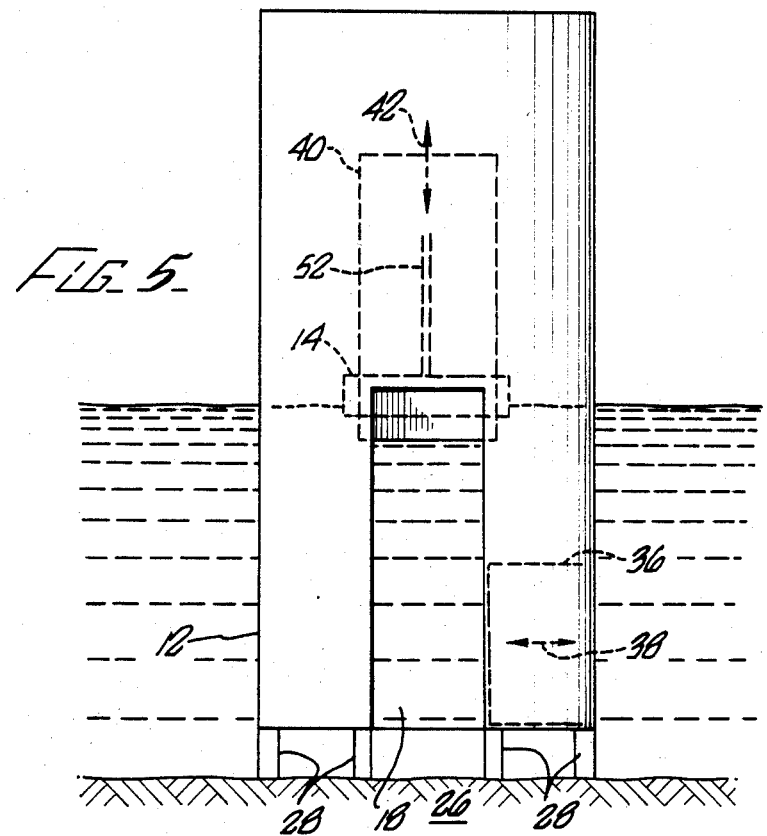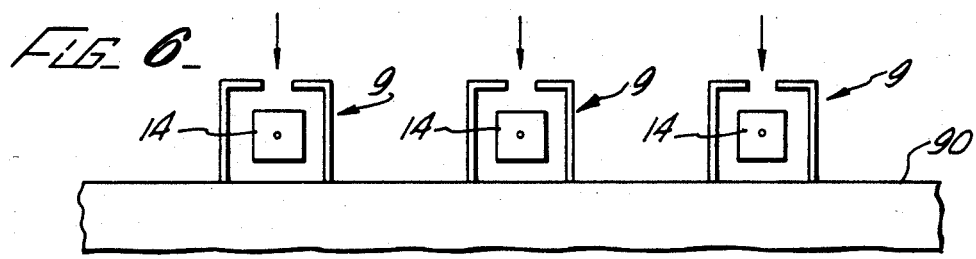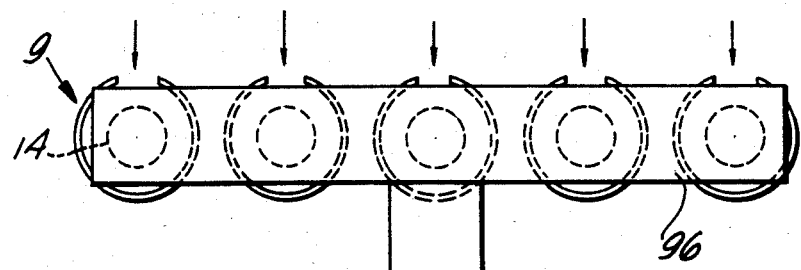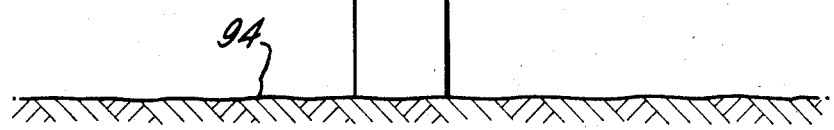

WAVE POWERED GENERATOR

BACKGROUND

Applicant has filed continuation-in-part application Ser. No. 774,893, on Sept. 11, 1985, which includes claims of a different scope than the claims of this patent.

The present invention relates to the conversion of the wave motion of bodies of water such as the ocean to useful forms of energy.

For thousands of years, man has dreamed of harnessing the energy of the oceans. Attempts have been made to generate electricity from the ebb and flow of the tides. Attempts have also been made to generate electricity from the up and down motion of a float on the oceans. Such attempts are described in U.S. Pat. No. 3,487,228 to Kriegel and U.S. Pat. No. 3,515,889 to Kammerer.

There are significant problems associated with harnessing energy from the motion of a float. One problem is that the float is continuously exposed to the punishing wave action of the oceans, which can severely damage the float, particularly during storms.

Another problem is constructing hardware that can convert the vertical motion of a float to useful energy. Articulated joints and other fragile structures are often required. These structures, subject to the constant hammering of the ocean waves and a corrosive salt water environment, have a limited life.

Another problem associated with power generating systems based upon a float moving up and down with ocean waves is down time associated with calm water. Waves of sufficient magnitude are required to achieve a level of efficiency warranting the capital investment required for a generating system. However, in many areas of the world the waves do not achieve the necessary amplitude during a substantial portion of the year, particularly during the summer. Thus, either the power generating system is not useful during these times of the year, or expensive reservoir systems must be constructed to provide energy continuously.

This invention is directed to solving these problems for fulfilling man's dream of harnessing the inexhaustible energy of the ocean waves.

SUMMARY

The present invention is directed to an apparatus that harnesses energy from the wave motion of a body of water such as the ocean utilizing a float that moves up and down in response to the wave motion of the ocean. The invention is based on the discovery that a single structure can be used to protect the float, protect equipment that converts the float motion to useful energy, and at the same time amplifies the action of the waves on the float. This structure is a resonant chamber operating in the fundamental mode.

The apparatus comprises a resonant chamber having an exterior wall with an opening therethrough for passage of water and waves into and out of the chamber. The chamber amplifies the wave motion of the body of water so that the amplitude of waves in the chamber is greater than the amplitude of the waves passing into the chamber through the opening. A float in the chamber moves up and down in response to the wave motion in the chamber. A power generator is operatively connected to the float for converting the kinetic energy of the float to useful energy.

So that the chamber is resonant and operates in the fundamental mode, preferably it is sized so that its equivalent diameter is from about 0.15L/pi to about L/pi, where L is the length between the crest of the waves entering the chamber through the opening and pi=3.14159. Generally the equivalent diameter of the chamber is less than 100 feet. For a chamber that is circular in horizontal cross-section, preferably its diameter is from about 0.2L/pi to about 0.6L/pi. Such a chamber can have a diameter of from about 40 to about 70 feet.

Preferably the opening is parallel to the crest of the waves entering the chamber and comprises from about 1/36 to about ⅓ of the perimeter of the chamber and preferably comprises at least 1/18 of the perimeter of the chamber.

In one version of the invention, a portion of the wall of the chamber can be provided by a breakwater structure, and a plurality of such chambers having a float therein can be associated with a single breakwater.

With a resonant chamber operating in the fundamental mode, the amplitude of the waves in the chamber can exceed twice the amplitude of the incoming waves. It is apparent that the present invention substantially increases the efficiency of any wave powered apparatus utilizing the ocean waves to raise and lower a float. Further, the walls of the chamber protect the float and associated equipment from the action of the oceans, thereby prolonging the life of the apparatus and allowing the use of relatively fragile, highly efficient equipment that could not be used in the absence of the chamber. For example, the float can be a "pancake" shaped float that is cylindrical having a diameter at least 4 times greater than the thickness of the float. This "pancake" float is more fragile than a spherical float, but is substantially less expensive. With the wall of the chamber protecting the pancake float, it can successfully be used.

DRAWINGS

These and other features, aspects, and advantages of the present invention will become better understood with reference to the following description, appended claims, and accompanying drawings where:

FIG. 5 is a front elevation view of another apparatus according to the present invention provided with means for varying the size of the opening in the wall of the chamber;

FIG. 6 is a top plan view of a breakwater forming the back wall of three resonant chambers according to the present invention;

FIG. 7 shows five chambers according to the present invention positioned at the end of a pier.

Figure 8:
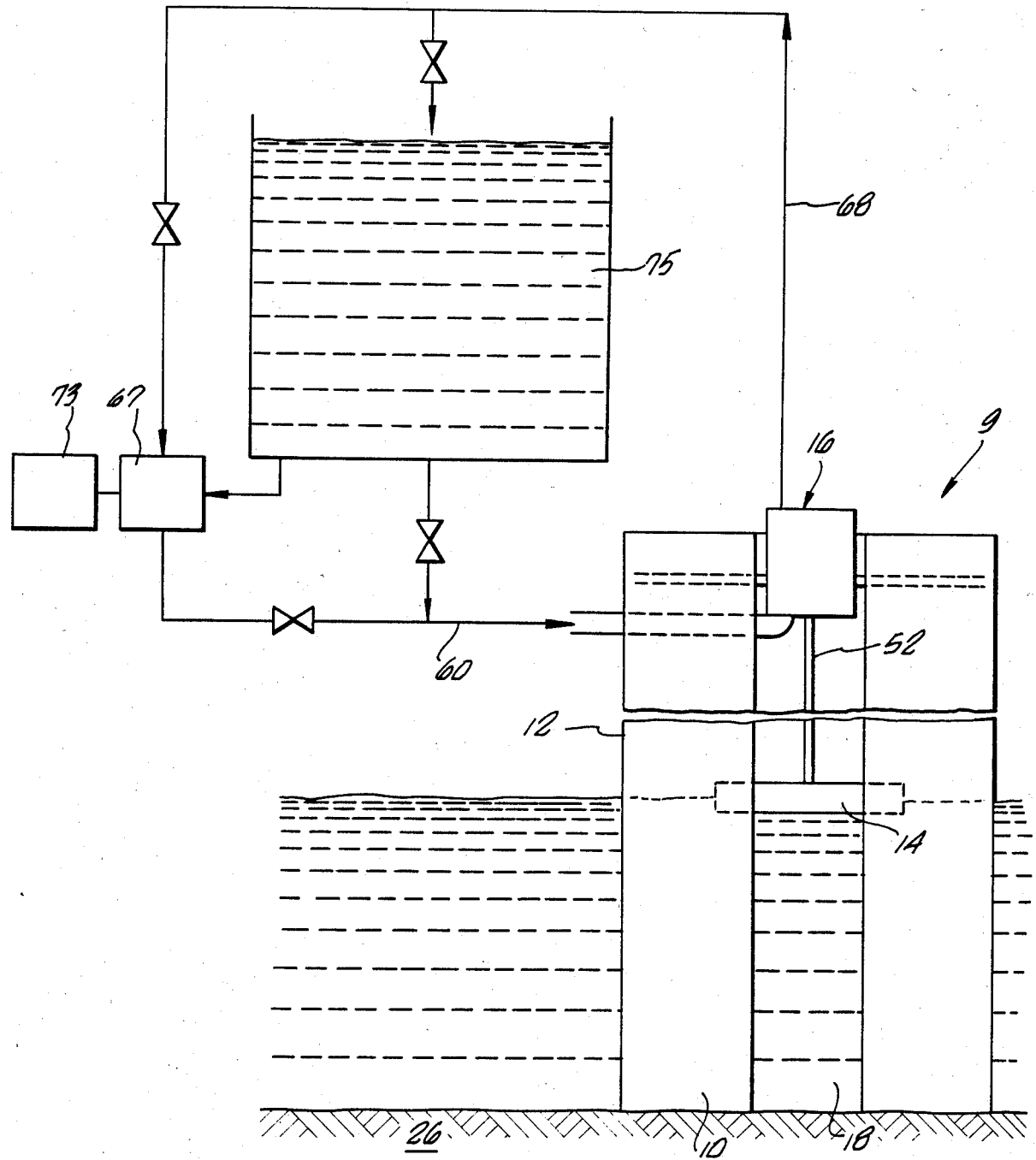

FIG. 8 schematically shows a system for generating electricity using a resonant chamber and float.

DESCRIPTION

Figure 2:
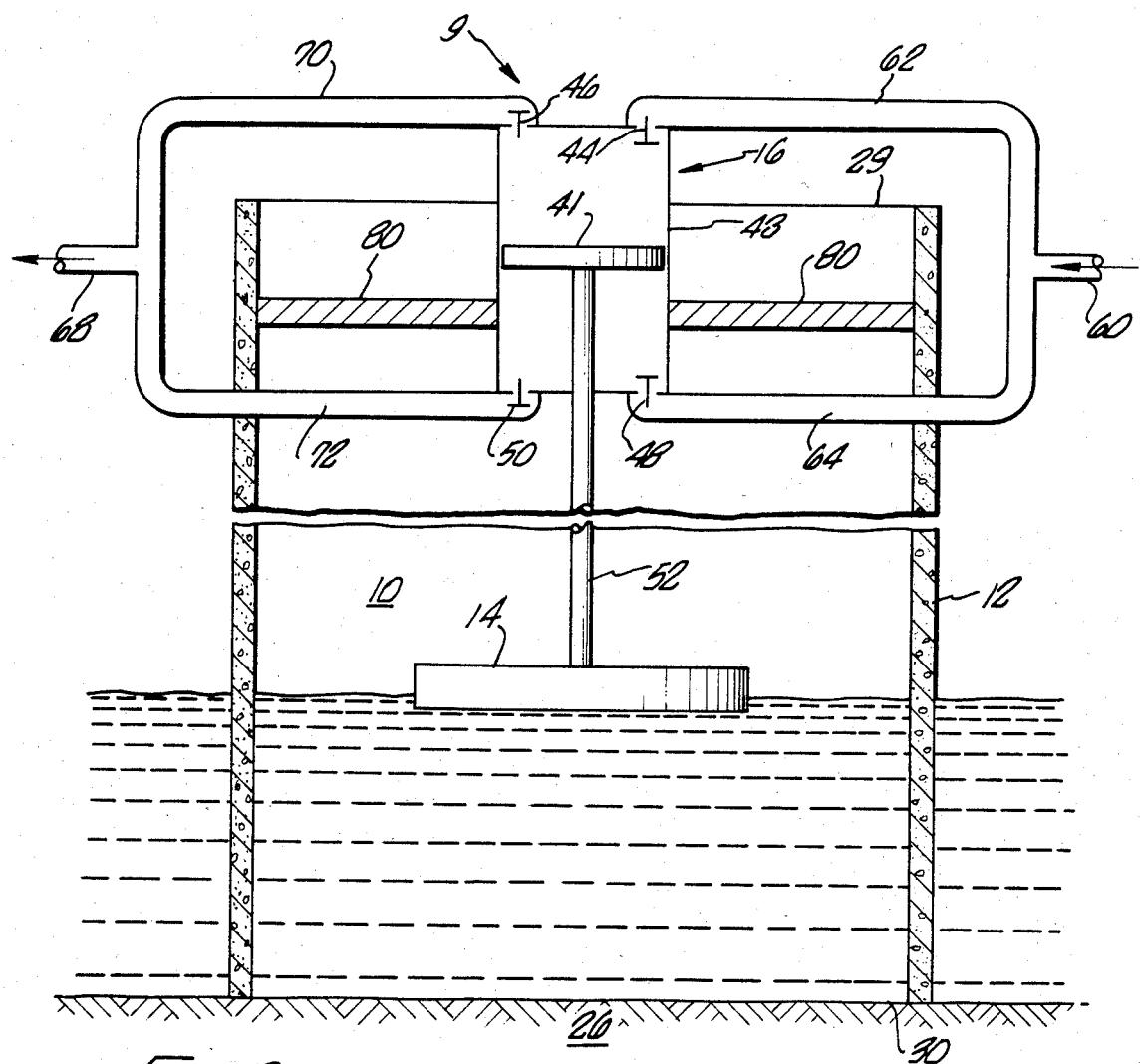
FIG. 2 is a partial sectional view of the apparatus of FIG. 1 taken on line 2—2 in FIG. 1.
Figure 1:
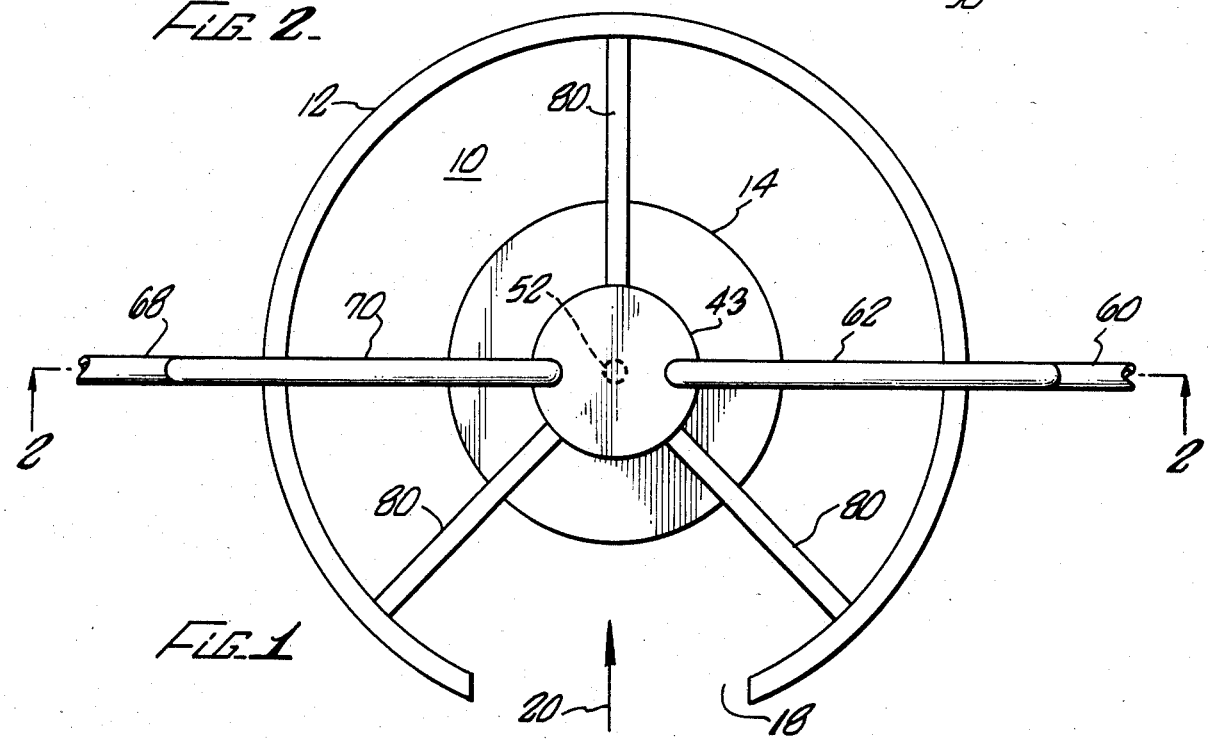
FIG. 1 is a top plan view of an apparatus for generating power from movement of ocean waves constructed in accordance with the principles of the present invention.

With reference to FIGS. 1 and 2, an apparatus 9 for converting the wave motion of the oceans into useful energy comprises as its principle elements a chamber 10 provided with an enclosing wall 12, a float 14, and a piston pump 16. The wall 12 has a slot or opening 18 therein positioned to receive incoming ocean waves as indicated by arrow 20 in FIG. 1.

The apparatus 9 is particularly adapted for use with the ocean waves. However, it can be used in any body of water that has sufficient wave energy to make the installation of the apparatus 9 economical.

The chamber 10 is sized, located, and configured to be a resonant chamber operating in the fundamental mode. By the term "resonant chamber" there is meant a chamber where the amplitude of the waves in the chamber is greater than the amplitude of waves passing into the chamber. By the term "fundamental mode, there is meant the first or principal resonant mode that occurs with an oscillating system.

It is important that the chamber operate in the fundamental mode for many reasons. First, the fundamental mode produces more amplification of the waves than other modes.

Second, a chamber operating in the fundamental mode can be smaller than one operating in a different mode. For example, a chamber operating in the next higher mode would need to be about 3 times larger in diameter than a chamber operating in the fundamental.

Third, a chamber operating in the fundamental mode is less susceptible to changes in wave conditions and can provide amplification over a wider range of wave conditions than a chamber operating in a higher mode. For example, a chamber operating in the fundamental mode can accommodate changes in the wave lenth L of about $\pm 30\%$ from the design value and still amplify the incoming waves. However, a chamber operating in the next higher mode and designed for the same L can accommodate deviations of only about $\pm 15\%$ without dampening the incoming waves. Fourth, the wave amplitude in the chamber is more uniform in the fundamental mode. With a higher mode, both peaks and troughs can be in the chamber at the same time. While in the fundamental mode, the height of the water in the chamber at any given time is generally uniform, i.e. at any one time the elevation everywhere in the chamber is above, equal to, or below the still water level.

The chamber 10 traps the energy of ocean waves and converts the orbital motion of a wave into a heave motion for moving the float 14 up and down in the chamber. The chamber is sized so that equivalent diameter of the chamber is from 0.15L/pi to L/pi, where L is the length between the crest of waves entering the chamber through the opening 18. The equivalent diameter, D, of a chamber is determined by the formula:

$$D = (4A/pi)^{\frac{1}{2}}$$

where A is the horizontal cross-sectional surface area of the chamber When dimensions of the chamber and float are specified herein, reference is being made to that dimension at the water line. For example, for a chamber whose horizontal cross-sectional area varies along the height of the chamber, A and D are determined at the water line.

L is dependent upon the depth of the water in which the chamber is located, as well as the period of the incoming waves. L can be determined from the following formula:

$$(2\ pi/T)^2 = (2gpi/L)\ \tanh(2pih/L)$$

where
T = the period of the waves;
h = the mean depth of the water in which the apparatus 9 is located; and
g = gravitational constant.
pi = 3.14159.

The chamber needs to be constructed to accommodate different wave conditions. By investigating the wave conditions at a particular site, ranges for the wave length at the site can be determined and thus the equivalent diameter of the chamber can be chosen.

Generally, as the depth of the water in which the apparatus 9 is located increases, the diameter of the chamber increases. Likewise, as the period of the waves increases, the diameter of the chamber increases. Typically, the period for waves is from about 5 to 20 seconds and the chamber is sited in a location where the water depth is from about 25 to about 60 feet. It is desirable that the depth of the water in the chamber be constant. Therefore, preferably the entire chamber is at least 50 feet from shore.

The equivalent diameter of the chamber is less than 20 to 100 feet, preferably greater than 20 feet, and more preferably from about 40 to about 70 feet to obtain high amplification in the fundamental mode under a great variety of wave conditions.

For a cylindrical chamber, preferably the diameter of the chamber is from about 0.2L/pi to about 0.6L/pi.

Figure 4:
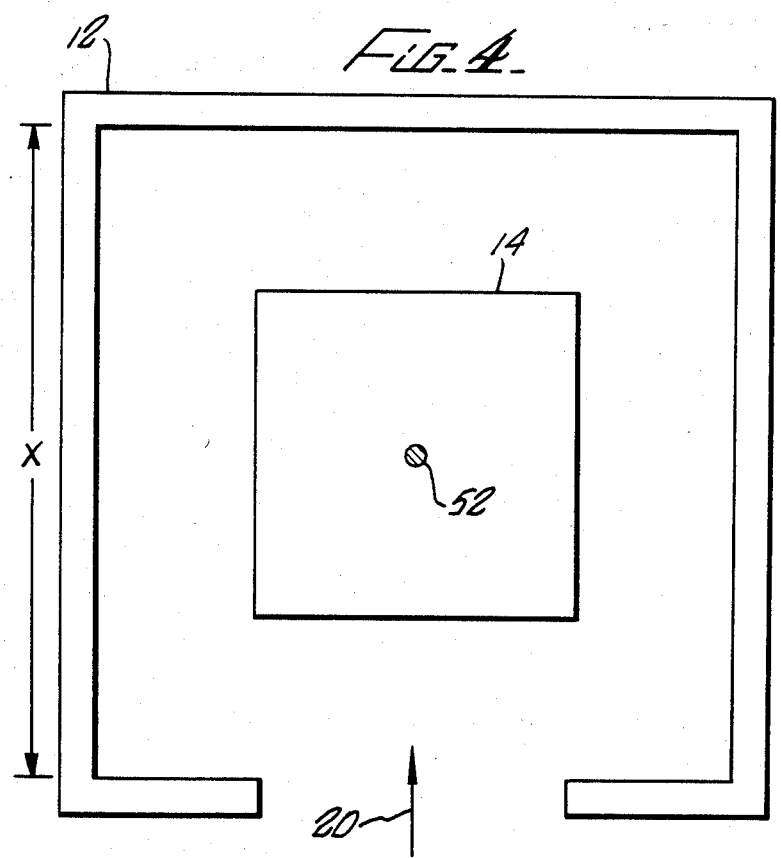
FIG. 4 is a top elevation view of another apparatus according to the present invention, having a square chamber.

For a chamber rectangular in horizontal cross-section, preferably the distance from the opening to the far wall opposite the opening is from about 0.15L/pi to about 0.7L/pi. This distance is shown as dimension X in FIG. 4.

The chamber can be of any shape, including circular, rectangular (including square), elliptical, or polygon. Preferaby the chamber is sufficiently tall that it is higher than the maximum amplitude of the waves in the chamber. The walls 12 of the chamber 10 can be formed of any suitable material such as steel or reinforced concrete.

As shown in FIG. 2, preferably the chamber is positioned with its walls directly on the sea bed 26. The absence of a solid floor can adversely affect amplification. Alternatively, as shown in FIG. 5, the chamber can be built on piles 28 above the sea bed 26 to help prevent sand from drifting into the chamber through the opening 18. The chamber can have a man-made top wall and bottom wall, but preferably for economic reasons, has neither.

The opening 18 generally is a vertical slot that extends along the entire height of the chamber wall 12. If desired, the opening 18 can extend down from the top 29 of the chamber 10 only part way toward the bottom 30 of the chamber. Similarly, the slot can extend only partway up from the bottom 30 of the chamber toward the top 29. If desired, the top of the slot can be below the mean water line. The advantage of a slot that extends only partway up the wall 12 of the chamber is that it protects the float and pump 16 from very large waves.

Figure 3:
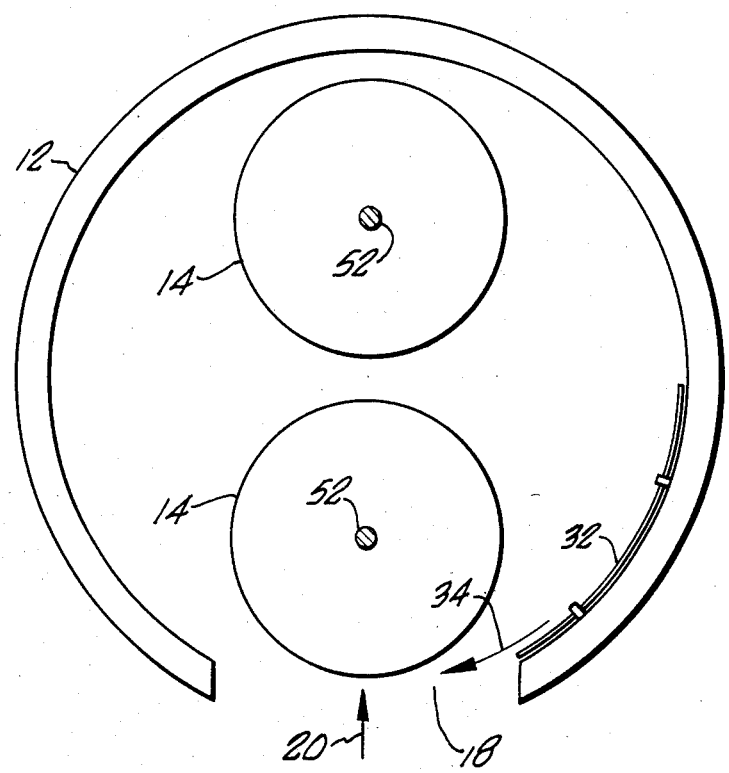
FIG. 3 is a top elevation view of another apparatus according to the present invention having two floats in a chamber.

As shown in FIGS. 3 and 5, the slot can be provided with means for varying its size. In the version shown in FIG. 3, a movable door 32 is mounted inside the chamber and positioned so that it can be slid across the opening 18 as shown by arrow 34. In times of storms, or when the equipment inside the chamber requires repair, the opening 18 can be partially or entirely closed with the door 32.

In the version shown in FIG. 5, a door 36 is provided for closing off the bottom portion of the opening 18 by sliding in the direction shown by arrow 38. Also, a second door 40 is provided for sliding downwardly in the direction of arrow 42 for closing off at least the top portion of the opening 18, and if desired, the entire opening.

At the water line, the opening comprises from about 1/36 to about ⅓ of the perimeter of the chamber, and more preferably from about 1/18 to about 2/9 of the perimeter of the chamber. Thus, for a cylindrical chamber, the opening extends about 10 degrees to 120 degrees, and more preferably from about 20 degrees to about 80 degrees. Thus, the size of the opening 18 can be varied, and the location of the opening 18 with reference to the water level and wave motion can be varied, depending upon the tides and wave conditions.

There can be more than one opening into the chamber, and the opening can be of any shape that results in effective amplification of waves in the chamber. Preferably the opening is located so as to be facing incoming waves, with the opening generally parallel to the crest of the waves.

The float 14 can be of any desired configuration, including prismatic such as a cube, cylindrical, either an elongated cylinder or a short cylinder such as a round plinth or "pancake"; or ellipsoidal such as spherical. Because of the protection provided by the chamber or wall 12, the survivability of the float is assured. Therefore, in designing and configuring the float, emphasis can be placed upon maximizing energy output and reducing costs.

Preferably the float is a "pancake" or plinth, i.e. a short section of a cylinder, where the diameter is substantially greater than the height of the float, and generally at least four times greater, and preferably at least six times greater. Preferably the surface area of all of the floats at the water line is at least one half the surface area of the chamber.

The float preferably has neutral buoyancy, i.e. the float has a float density of about one half where one half of the volume of the float is above the water surface and about one half the volume of the float is below the water surface. This results in a force on the power generating equipment that is approximately equal on the up and down strokes of the float. Moreover, if the float were so light that the bulk of it were above the water, or if the float were so dense that the bulk of it were below the water, inadequate tracking of the wave motion could result. For maximum harnessing of the wave motion, it is important that the float closely track the waves.

The float 14 can be formed of a corrosion resistant material, such as stainless steel, monel, or reinforced fiberglass. It can be solid or it can be hollow. If it is hollow, it can contain air or other gas, or a liquid such as the ocean water itself or a solid such as sand or concrete.

As shown in FIG. 3, there can be more than one float 14 in a chamber 10.

The kinetic energy of the float 14 can be converted into useful energy utilizing a wide variety of previously known systems used to convert the motion of a float to other forms of energy such as electricity. Among systems that are useful are the hydraulic systems shown in U.S. Pat. Nos. 3,487,228 and 3,515,889 where a float is operatively connected to a piston pump, and the pump is connected to a hydraulic motor that drives an electrical generator. Other systems are shown in U.S. Pat. Nos. 138,474; 430,790; 599,756; 616,615; and 4,281,257.

In the version shown in FIGS. 1, 2 and 8, the pump 16 is a piston pump having a piston 41 reciprocatingly moving up and down in a cylinder 43. The pump pumps water both on the upstroke and downstroke, with the region above the piston 41 being provided with an inlet valve 44 and an outlet valve 46 and the region below the piston 41 also being provided with an inlet valve 48 and an outlet valve 50. All four of the valves 44, 46, 48 and 50 are one way valves such as check valves.

A vertical piston rod 52 connects the float 14 to the piston 41. As the float 14 moves from the top of a wave to the trough between two waves, the piston 41 is pulled downwardly by the rod 52. This forces hydraulic fluid out of the lower outlet valve 50 and brings hydraulic fluid into the cylinder 43 through the upper inlet valve 44. Then, as the float 14 moves from the trough to the peak of a wave, the piston 41 is pushed upwardly. This pumps hydraulic fluid out of the cylinder 43 through the upper outlet valve 46 and brings water into the cylinder through the lower inlet valve 48.

Hydraulic fluid is passed into the cylinder 42 through a conduit 60 having an upper branch 62 connected to the upper inlet valve 44 and a lower branch 64 connected to the lower inlet valve 48. The pumped fluid is pumped to power generating means such as a hydraulic motor 67 through a conduit 68 having an upper branch 70 connected to the upper outlet valve 46 and a lower branch 72 connected to the lower outlet valve 50. The motor 67 can be used to operate a generator 73. If desired, a reservoir 75 can be provided for storing pumped hydraulic fluid for use when wave conditions are inadequate or when repairing equipment.

The hydraulic fluid is a liquid and can be water such as ocean water and fresh water, or can be oil. The hydraulic system can be at low pressure or at high pressure.

Preferably the float is positioned in the chamber so that it is centrally located in the chamber, or is closer to the back wall of the chamber than it is to the opening. These positions are more effective in taking advantage of the amplification of the chamber 10 than is a position that is close to the opening 18.

An advantage of the use of a resonant chamber 10 is that the walls 12 of the chamber can be used to structurally support the equipment used for converting the kinetic energy of the float 14 into useful energy. For example, as shown in FIGS. 1 and 2, the pump 16 is supported by a plurality of girders 80 extending radially inwardly from the inside of the wall 12 of the chamber 10.

As shown in FIGS. 6 and 7, a plurality of wave generating device 9 can be used together. In the version shown in FIG. 6, there are three devices 9 where the back wall of each device is provided by a breakwater 90. The breakwater can be an existing breakwater 90, or it can be prepared especially for the wave powered generating equipment. Thus, not only do the wave generating devices 9 produce useful energy, the system as a whole helps protect shore line structures.

In the version shown in FIG. 7, the devices 9 are positioned at the end of a pier 92 extending perpendicular to a shore line 94. The devices 9 are in a line parallel to the shore line and include a walkway 96 on top of them. This walkway 96 serves as an additional pier. The system in FIG. 7 not only generates energy from the ocean waves, but provides enhanced recreational and boating opportunities.

The power generating system of the present system has significant advantages. Because of the resonant chamber, increased energy output from the float and pump are possible. Moreover, the chamber walls 12 protect the float and other structures from the action of the ocean. Also, the structure is very simple, not requiring articulated arms and other fragile, complex structures for converting the up and down motion of the float 14 to useful energy.

EXAMPLE

A test was conducted on a 1:40 scale. The chamber was cylindrical having a 1½ foot diameter, a 60 degree opening, and was placed in water 1 foot deep. The incoming waves had a period of from one second to three seconds. The float was cylindrical, having a diameter of 9.6 inches and a thickness of 3/2 inch. It was made of plywood, lead and Styrofoam TM and was half submerged. This scaled test corresponded to a chamber having a 60 foot diameter with a 60 degree opening placed in 40 feet deep water with a wave period of 6 seconds to 18 seconds, and a float diameter of 32 feet, the float being 5 feet thick.

The amplification factor achieved in the unloaded condition was from 2 to 3.5. In other words, the amplitude of the motion of the float was from 2 to 3.5 times greater than the amplitude of the waves entering the chamber. The chamber operated in the fundamental resonance mode.

Although the present invention has been described in considerable detail with reference to certain preferred vesions thereof, other versions are possible. For example, the chamber in some situations may not be resonant, depending upon the character of the ocean waves. However, even in such a configuration, the chamber serves to protect the float and other equipment from the action of the ocean waves. Therefore, the spirit and scope of the appended claims should not necessarily be limited to the description of the preferred versions contained herein.

What is claimed is:

1. An apparatus for generating power from the wave motion of the ocean comprising:
    (a) a resonant chamber in the ocean, the chamber having an exterior substantially vertical wall substantially perpendicular to the plane of the water with an opening therethrough, the opening generally facing the direction of wave propagation for passage of water into and out of the chamber, the chamber amplifying the wave motion of the body of water in the fundamental mode so that the amplitude of waves in the chamber is greater than the amplitude of the waves passing into the chamber, the chamber being sized so that the equivalent diameter of the chamber is from 0.15L/pi to L/pi where L is the length between the crest of waves passing into the chamber;
    (b) a float in the chamber, the float moving up and down in response to the wave motion in the chamber; and
    (c) power generating means operatively connected to the float for converting the kinetic energy of the float to useful energy.

2. The apparatus of claim 1, wherein the chamber is circular in horizontal cross-section, and the diameter of the chamber is from 0.2L/pi to 0.6L/pi.

3. The apparatus of claim 1, wherein the entire chamber is spaced apart from the shore line by at least 50 feet.

4. The apparatus of claim 1 in which the chamber is rectangular in horizontal cross-section, and the distance from the opening to the opposite wall is from 0.15L/pi to 0.7L/pi.

5. The apparatus of claim 1 in which the chamber is circular in horizontal cross-section.

6. The apparatus of claim 5 in which the diameter of the chamber is from 40 to 70 feet.

7. The apparatus of claim 1 having an equivalent diameter less than 100 feet.

8. The apparatus of claim 7 having an equivalent diameter less than 70 feet.

9. The apparatus of claim 5 in which the opening comprises at least 1/18 of the perimeter of the chamber.

10. The apparatus of claim 9 in which the opening comprises from 1/18 to 2/9 of the perimeter of the chamber.

11. The apparatus of claim 1 comprising two floats in the chamber.

12. The apparatus of claim 1 in which the float is cylindrical having a diameter at least 4 times greater than its height.

13. The apparatus of claim 1 in which a portion of the wall of the chamber is formed by a breakwater.

14. The apparatus of claim 1 in which at least a portion of the power generating means is supported by the wall.

15. The apparatus of claim 1 in which the surface area of the largest horizontal cross-section through the float is at least 25% of the surface area of the water in the chamber.

16. The apparatus of claim 1 in which the center of mass of the float is farther from the opening that it is from the wall of the chamber directly opposite the opening.

17. The apparatus of claim 1 including means for varying the width of the opening.

18. The apparatus of claim 1 in which the opening has a vertical extent, and including means for varying the height of the opening.

19. The apparatus of claim 18 in which the means for varying the height comprises means for closing only a top portion of the opening.

20. The apparatus of claim 18 in which the means for varying the height comprises means for closing only a bottom portion of the opening.

21. The apparatus of claim 1 in which the wall of the chamber is above the floor of the body of water.

22. The apparatus of claim 1 including a door for substantially completely closing the opening.

23. The apparatus of claim 1 in which the power generating means is a piston pump pumping a liquid to a hydraulic motor.

24. An apparatus for generating power from the wave motion of the oceans comprising:
    (a) a resonant chamber in the water, the chamber having an exterior cylindrical, substantially vertical wall substantially perpendicular to the plane of the water with an opening therethrough for passage of water into and out of the chamber, the opening generally facing the direction of wave propagation, the entire chamber being at least 50 feet from the shoreline, the chamber amplifying the wave motion of the ocean in the fundamental mode so that the amplitude of waves in the chamber is at least twice as large as the amplitude of the waves passing into the chamber, the diameter of the chamber being less than 100 feet and from 0.2L/pi to 0.6L/pi where L is the length between the crest of waves entering the chamber through the opening, the opening comprising from about 1/18 to about ⅓ of the perimeter of the chamber;

(b) a float in the chamber, the float moving up and down in response to the wave motion in the chamber; and (c) a piston pump pumping a liquid, the pump being operatively connected to the float for converting the kinetic energy of the float to useful energy.

25. The apparatus of claim 24 in which the diameter of the chamber is from about 40 to about 70 feet.

26. An apparatus for generating power from the wave motion of the ocean comprising:

(a) a chamber in the water at least 50 feet from the shore line, the chamber having a substantially vertical exterior wall substantially perpendicular to the plane of the water with an opening therethrough for passage of water into and out of the chamber, the opening generally facing the direction of wave propagation, the equivalent diameter of the chamber at the water line being at least 30 feet and less than 100 feet;

(b) a float in the chamber protected by the wall, the float moving up and down in response to the wave motion in the chamber; and (c) power genreating means operatively connected to the float for converting the kinectic energy of the float to useful energy.

27. The apparatus of claim 26 including means for varying the width of the opening.

28. The apparatus of claim 26 in which the opening has a vertical extent, and including means for varying the height of the opening.

29. The apparatus of claim 28 in which the means for varying the height comprises means for closing only a top portion of the opening.

30. The apparatus of claim 29 in which the means for varying the height comprises means for closing only a bottom portion of the opening.

31. The apparatus of claim 26 in which the wall of the chamber is above the floor of the ocean.

32. The apparatus of claim 28 including a door for substantially completely closing the opening.

33. An apparatus for generating power from the wave motion of the oceans comprising:

(a) a chamber in the ocean, the chamber having a substantially vertical exterior wall substantially perpendicular to the plane of the water with a portion of the wall formed by a breakwater, the wall having an opening therethrough for passage of water into and out of the chamber, the opening generally facing the direction of wave propagation;

(b) a float in the chamber, the float moving up and down in response to the wave motion in the chamber; and (c) power generating means operatively connected to. the float for converting the kinetic energy of the float to useful energy.

34. The apparatus of claim 33 comprising a plurality of such chambers, each chamber having at least one float therein, wherein the breakwater forms a portion of the wall of each chamber.

35. The apparatus of claim 34 wherein each chamber is a resonant chamber operating in the fundamental mode and wherein the amplitude of waves in each chamber is greater than the amplitude of waves passing into the chamber through the opening, the equivalent diameter of each chamber being less than 100 feet.

36. The apparatus of claim 35 wherein the amplitude of waves in chamber is at least twice as large as the amplitude of waves passing into the chamber through the opening.

37. An apparatus comprising a resonant chamber in the ocean, the chamber operating in the fundamental mode and having a substantially vertical exterior wall substantially perpendicular to the plane of the water with an opening therethrough open to the waves, the opening generally facing the direction of wave propagation, the equivalent diameter of the chamber being from 0.15L/pi to L/pi where L is the length of the waves entering the chamber through the opening, the chamber having at least one float therein.

38. The apparatus of claim 37 wherein the chamber has an equivalent diameter of less than 40 to about 70 feet at the water line.

39. The apparatus of claim 38 in which the area of the float at the water line is at least one-quarter the area of the chamber at the water line.

40. The apparatus of claim 37 in which the area of the float at the water line is at least one-quarter the area of the chamber at the water line.

41. The apparatus of claim 37 in which the chamber amplifies waves by a factor of at least 2.

* * * * *